United States Patent
Matsubara et al.

(10) Patent No.: US 10,620,619 B2
(45) Date of Patent: Apr. 14, 2020

(54) PLANT-MONITORING SYSTEM AND MONITORING METHOD

(71) Applicant: MITSUBISHI HEAVY INDUSTRIES, LTD., Tokyo (JP)

(72) Inventors: Wataru Matsubara, Tokyo (JP); Naohiko Ishibashi, Tokyo (JP); Ryo Kamito, Tokyo (JP); Susumu Okino, Tokyo (JP); Takeo Shinoda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/080,622

(22) PCT Filed: Dec. 9, 2016

(86) PCT No.: PCT/JP2016/086810
§ 371 (c)(1),
(2) Date: Aug. 28, 2018

(87) PCT Pub. No.: WO2017/149893
PCT Pub. Date: Sep. 8, 2017

(65) Prior Publication Data
US 2019/0086909 A1    Mar. 21, 2019

(30) Foreign Application Priority Data

Mar. 1, 2016    (JP) ................................. 2016-039023

(51) Int. Cl.
*G05B 23/02* (2006.01)
*G08B 17/117* (2006.01)
*G08B 25/00* (2006.01)
*G08B 17/12* (2006.01)
*H04N 5/33* (2006.01)

(52) U.S. Cl.
CPC ......... *G05B 23/0235* (2013.01); *G05B 23/02* (2013.01); *G05B 23/027* (2013.01);
(Continued)

(58) Field of Classification Search
USPC ......................................................... 340/632
See application file for complete search history.

(56) References Cited

U.S. PATENT DOCUMENTS 3,925,763 A    12/1975 Wadhwani et al.
5,121,344 A    6/1992  Laage et al.
(Continued)

FOREIGN PATENT DOCUMENTS

JP    S59-9710 A    1/1984
JP    S599710    *    1/1984
(Continued)

OTHER PUBLICATIONS

International Search Report issued in corresponding International Application No. PCT/JP2016/086810 dated Mar. 7, 2017 (2 pages).
(Continued)

*Primary Examiner* — Thomas S McCormack
(74) *Attorney, Agent, or Firm* — Osha Liang LLP

(57) ABSTRACT

A plant-monitoring system includes: at least three detection elements, the detection elements being at least one type of detection element for monitoring a subject being monitored; a detection network configured by disposing the at least three detection elements in a plant; a storage unit that receives detection data from each of the detection elements to record the detection data as recorded data; and a processing computing unit. The processing computing unit receives the detection data from each of the detection elements, determines presence or absence of a fault by comparing the detection data with the recorded data, and in a case where occurrence of a fault is recognized, identifies a place of occurrence of the fault based on the detection data, and transmits the result of the place of occurrence of the fault to a predetermined incident response team.

10 Claims, 2 Drawing Sheets

(52) U.S. Cl.
CPC ............ *G08B 17/117* (2013.01); *G08B 25/00* (2013.01); *G08B 17/125* (2013.01); *H04N 5/33* (2013.01)

(56) References Cited

U.S. PATENT DOCUMENTS

| | | | | |
|---|---|---|---|---|
| 2003/0139837 | A1* | 7/2003 | Marr .................. | G05B 23/0278 700/110 |
| 2005/0055609 | A1* | 3/2005 | Yuan .................. | G05B 23/0254 714/47.2 |
| 2008/0157984 | A1* | 7/2008 | Li ......................... | G08B 7/066 340/584 |

FOREIGN PATENT DOCUMENTS

| | | |
|---|---|---|
| JP | H02-173897 A | 7/1990 |
| JP | H04-291606 A | 10/1992 |
| JP | 2001-255181 A | 9/2001 |
| JP | 2011-170877 A | 9/2011 |
| JP | 2012-173790 A | 9/2012 |
| JP | 2013-178690 A | 9/2013 |
| JP | 2014-241062 A | 12/2014 |
| WO | 2013-152122 A2 | 10/2013 |

OTHER PUBLICATIONS

International Preliminary Report on Patentability issued in corresponding International Application No. PCT/JP2016/086810 dated Sep. 4, 2018 (6 pages).

Extended European Search Report issued in corresponding European Patent Application No. 16892728.3, dated Aug. 5, 2019 (7 pages).

Office Action in corresponding Japanese Application No. 2016-039023, dated Dec. 27, 2019 (4 pages).

* cited by examiner

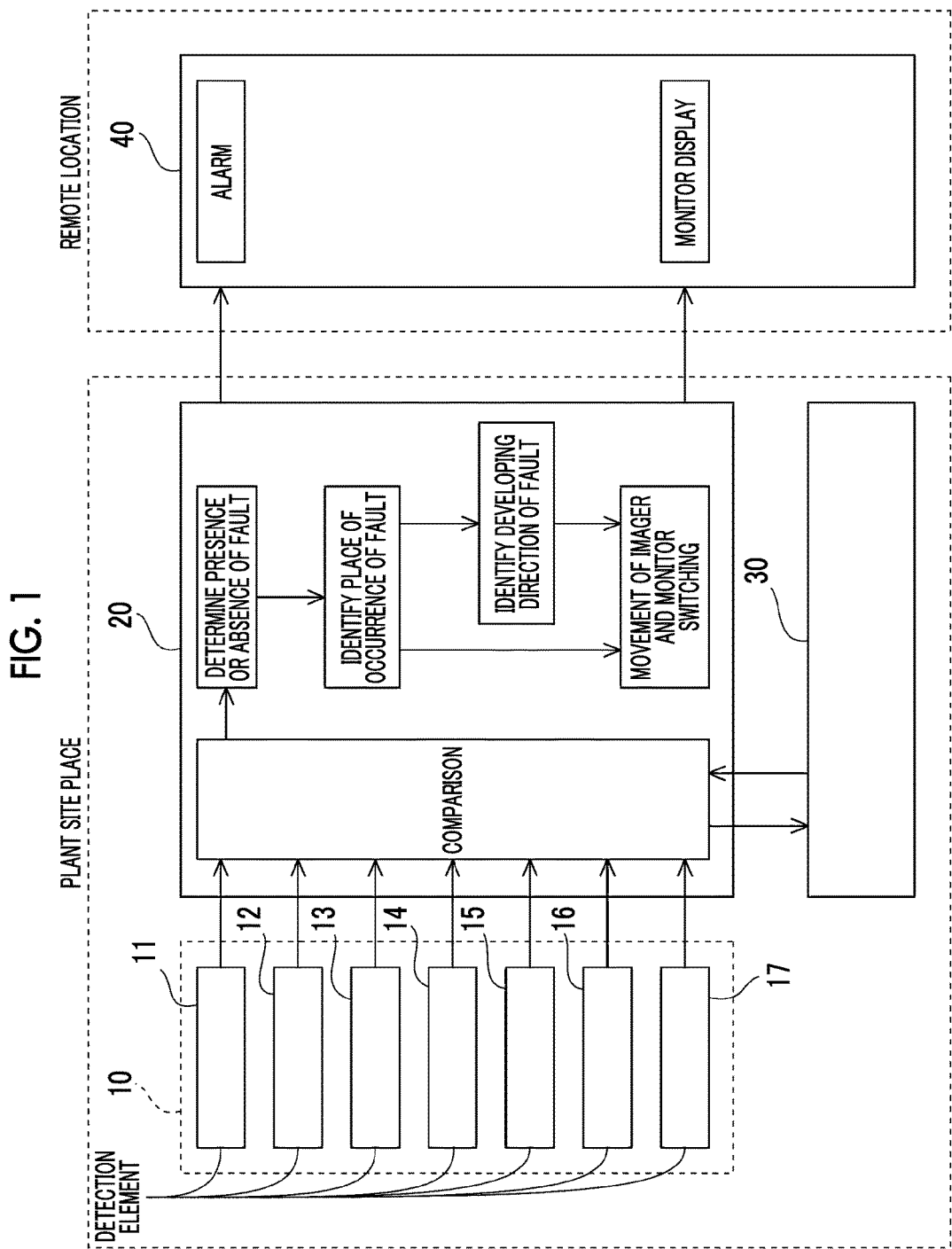

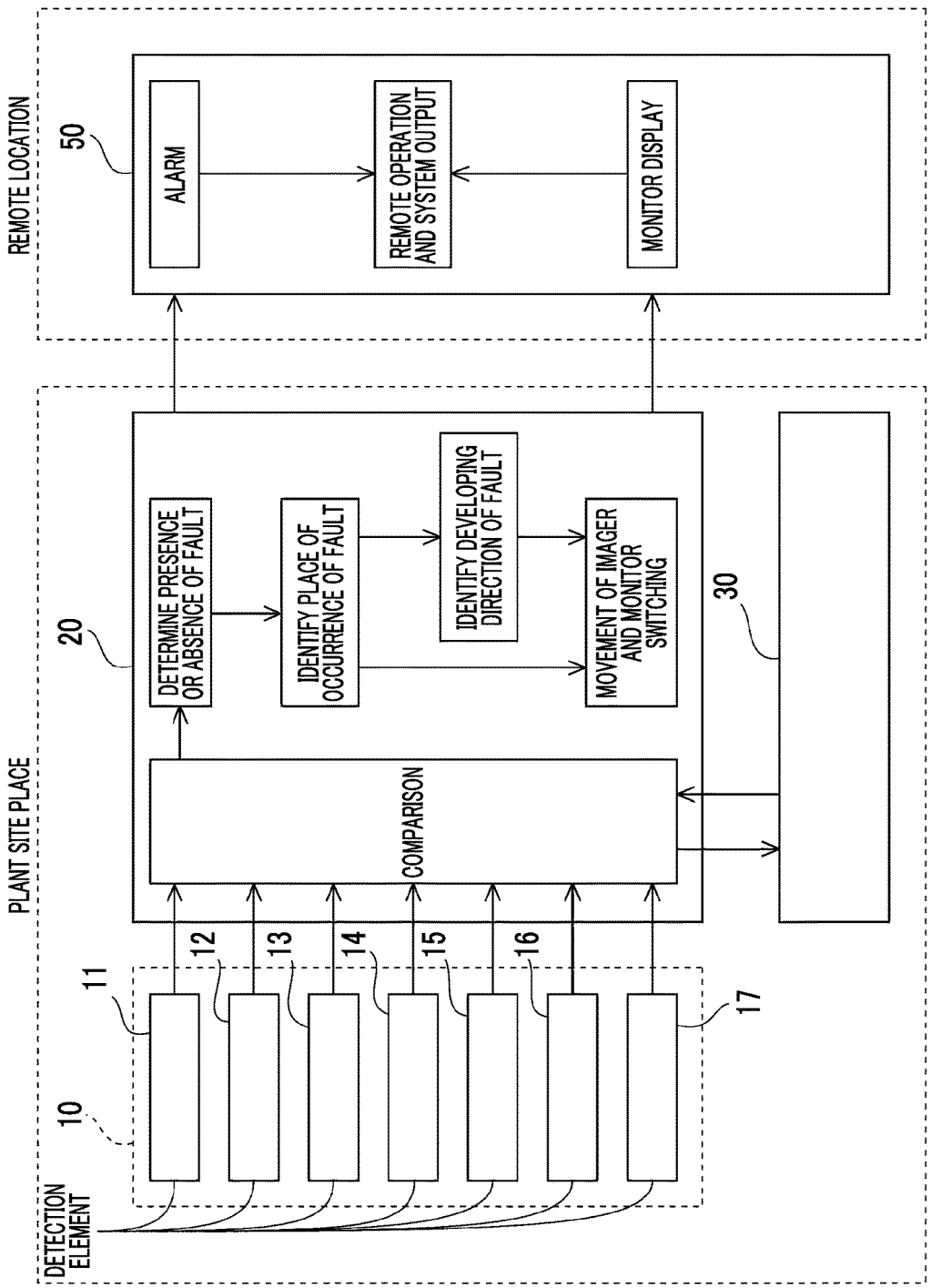

PLANT-MONITORING SYSTEM AND MONITORING METHOD

TECHNICAL FIELD

The present invention relates to a plant-monitoring system and a monitoring method, and particularly relates to a plant-monitoring system and a monitoring method in a liquefied natural gas (LNG) liquefaction plant.

BACKGROUND ART

In the related art, in a chemical plant and a power plant such as an LNG liquefaction plant, a sensor for detecting the occurrence of a fault is provided in the vicinity of a device, which is a subject being monitored, and response measures are performed after checking the occurrence of the fault.

As such a monitoring system, a system that causes a video camera to automatically face a point of occurrence and causes a monitor screen to show the state of the point of occurrence when a microphone provided in an unmanned substation detects the sound of a fault is known (for example, PTL 1). In addition, a system that detects a sign of a fault in a plant configuring device by means of sound, vibration, and infrared image sensors is known (for example, PTL 2).

CITATION LIST

Patent Literature

[PTL 1] Japanese Unexamined Patent Application Publication No. 2-173897
[PTL 2] Japanese Unexamined Patent Application Publication No. 4-291606

SUMMARY OF INVENTION

Technical Problem

In the example described above, it is necessary to make an operator, who rushes to a spot of occurrence to handle a fault, stand by at a place in the vicinity when the system has detected that a fault has occurred. In addition, it is necessary for the operator to check detailed information of the fault at the spot of occurrence. There is a possibility that a fault occurred in an unexpected place cannot be detected.

Solution to Problem

An object of the invention is to provide, in view of the circumstances, a plant-monitoring system and a monitoring method, in which a fault that has occurred in a wide region of the plant can be remotely learned in detail and a process in response to the occurrence of the fault can be performed.

The invention is one aspect of a plant-monitoring system. According to the invention, there is provided a plant-monitoring system including at least three detection elements, the detection elements being at least one type of detection element for monitoring a subject being monitored, a detection network configured by disposing the at least three detection elements in a plant, a storage unit that receives detection data from each of the detection elements to record the detection data as recorded data, and a processing computing unit that receives the detection data from each of the detection elements, determines presence or absence of a fault by comparing the detection data with the recorded data, in a case where occurrence of a fault is recognized, identifies a place of occurrence of the fault based on the detection data, and transmits the result of the place of occurrence of the fault to a predetermined incident response team. In the detection network, it is also possible to combine the detection data from each of the detection elements randomly provided on plant configuring devices, in addition to the detection elements according to the invention.

In the monitoring system, in a case where the occurrence of a fault is recognized, the processing computing unit can identify a developing direction of the fault based on the detection data from each of the detection elements and transmit the result of the developing direction to the predetermined incident response team. In addition, the monitoring system can further include a remote operation unit that operates a device in the plant.

In the monitoring system, it is preferable that the detection elements be at least one type of detection element selected from the group consisting of a sound detector detecting volume and frequency, a vibration detector detecting amplitude and frequency of vibration, a gas detector detecting occurrence of gas, a flame detector detecting occurrence of flame, a smoke sensor detecting occurrence of smoke, an infrared imager acquiring an image of an infrared region, and a visible imager acquiring an image of a visible region.

In the monitoring system, it is preferable that the detection network be formed by three-dimensionally disposing at least four detection elements.

In addition, the invention is another aspect of a plant-monitoring method. According to the invention, there is provided a plant-monitoring method including an acquiring step of acquiring detection data from detection elements by using a detection network configured by disposing at least three detection elements, the detection elements being at least one type of detection element for monitoring a subject being monitored, in a plant, a storing step of receiving the detection data from each of the detection elements to record the detection data as recorded data, and a processing computing step of receiving the detection data from each of the detection elements, determining presence or absence of a fault by comparing the detection data with the recorded data, and in a case where occurrence of a fault is recognized, identifying a place of occurrence of the fault based on the detection data, and transmitting the result of the place of occurrence of the fault to a predetermined incident response team. In the acquiring step, it is also possible to combine detection data from each of the detection elements randomly provided on plant configuring devices, in addition to the detection elements according to the invention.

In the monitoring method, in a case where the occurrence of a fault is recognized, the processing computing step can include identifying a developing direction of the fault based on the detection data from each of the detection elements and transmitting the result of the developing direction to the predetermined incident response team. In addition, the monitoring method can further include a remote operation step of operating a device in the plant.

In the monitoring method, it is preferable that at least one type of detection element selected from the group consisting of a sound detector detecting volume and frequency, a vibration detector detecting amplitude and frequency of vibration, a gas detector detecting occurrence of gas, a flame detector detecting occurrence of flame, a smoke sensor detecting occurrence of smoke, an infrared imager acquiring an image of an infrared region, and a visible imager acquiring an image of a visible region be used as the detection elements.

In the monitoring method, it is preferable that the detection network be formed by three-dimensionally disposing at least four detection elements.

Advantageous Effects of Invention

According to the invention, the plant-monitoring system and the monitoring method, in which a fault that has occurred in a wide region of the plant can be remotely learned in detail and a process in response to the occurrence of the fault can be performed, are provided.

BRIEF DESCRIPTION OF DRAWINGS

FIG. 1 is a conceptual diagram showing a first embodiment of a plant-monitoring system and a monitoring method according to the invention.

FIG. 2 is a conceptual diagram showing a second embodiment of a plant-monitoring system and a monitoring method according to the invention.

DESCRIPTION OF EMBODIMENTS

Hereinafter, embodiments of a plant-monitoring system and a monitoring method according to the invention will be described in detail with reference to the accompanying drawings. The accompanying drawings are drawings for describing the outline of the embodiments, and some of auxiliaries are omitted.

FIG. 1 shows a first embodiment of a plant-monitoring system according to the invention. The plant-monitoring system shown in FIG. 1 includes a detection network 10, which is provided in a liquefied natural gas (LNG) liquefaction plant site and is formed of at least three detection elements, a processing computing unit 20, and a storage unit 30. In the plant-monitoring system according to the embodiment, a main control room in the vicinity of the plant is unmanned in general.

The detection elements are at least one type of detector, sensor, and/or imager provided in the plant in order to monitor a subject being monitored, and detect numeric data or image data, which is obtained by measuring or imaging the subject being monitored in a detectable region, as detection data. The "subject being monitored" is a region on a plane or a space, which includes one or more devices in the plant. In addition, the "detectable region" is a region on a plane or a space, which can be detected by the detection elements, and/or one or more devices in the region.

The detection network 10 is a plane or a space configured by disposing at least three detection elements in the plant. Monitoring a subject being monitored in a wide region is made possible by the detection network 10 including a detectable region formed by at least three detection elements. It is preferable to configure the detection network 10 by planarly disposing at least three detection elements in the plant, and it is more preferable to configure the detection network by three-dimensionally disposing at least four detection elements in the plant. If the detection network 10 is configured by the planarly or three-dimensionally disposed detection elements, for example, a place of occurrence of a fault and a developing direction of a fault on the floor of the plant or in the plant can be identified. The "developing direction" means a direction in which a region with a fault expands or develops from a place of occurrence of a fault.

The developing direction includes, for example, a region or a direction, in which an oil leak, a gas leak, smoke, and fire intensify or develop, and a direction in which an intruder heads for. It is also possible to combine the respective detection elements which are randomly provided on plant configuring devices.

It is sufficient if an interval between the detection elements for forming a plane or a space of the detection network 10 is an interval that can configure a plane or a space, and the interval is not limited. More specifically, it is preferable that the interval be one interval in the smallest detectable region out of detectable regions of the detection elements, and the interval varies according to a case where the detectable region is an asymmetric region or the state of a plane or a space, which is a subject being monitored. Accordingly, an uninterrupted detectable region is configured in the plant and the region can be set as a subject being monitored.

In addition, the detection network 10 can also be configured to further include a detection element in addition to the detection elements for forming a plane or a space thereof. In this case, detection intensity can be increased according to a subject being monitored, for example, by further providing a detection element in the vicinity of a certain device, a plane, or a space, which is a subject being monitored.

The processing computing unit 20 is configured to continuously acquire detection data from the respective detection elements configuring the detection network 10, and to determine the presence or absence of occurrence of a fault (presence or absence of a fault) by comparing the detection data from the detection elements with recorded data in the storage unit 30. More specifically, when one or more pieces of detection data detected by the detection elements are acquired, the processing computing unit 20 transmits a request signal to the storage unit 30 and obtains a normal range corresponding to the one or more pieces of detection data from the storage unit 30. In addition, in a case where all of the one or more pieces of acquired detection data are within the normal range, the processing computing unit 20 determines that a fault has not occurred. In a case where at least one piece of data, out of the pieces of acquired detection data, is outside the normal range, the processing computing unit determines that a fault has occurred. In a case where the detection data is detection data related to the presence or absence of gas, flame, and smoke, the processing computing unit 20 determines that the detection data indicating that gas, flame, and smoke are detected is outside the normal range. In a case where it is determined that a fault has not occurred, the processing computing unit 20 is configured to transmit the detection data to the storage unit 30 as past data so as to be recorded in the storage unit 30. The "normal range" means a value or an image, which is detected by the detection elements, a numeric range or an image, which corresponds to the presence or absence of gas, flame, and smoke, or data of the presence or absence of gas, flame, and smoke.

When it is determined that a fault has occurred, the processing computing unit 20 is configured to identify, as a place of occurrence of a fault, the position of a detection element which transmitted detection data indicating that there is a fault (hereinafter, also referred to as fault detection data). In a case where two or more pieces of fault detection data are simultaneously received, the processing computing unit 20 is configured to determine that there are two places of occurrence of a fault and to identify the places as places of occurrence of a fault. In addition, the processing computing unit 20 is configured to transmit an alarm issuance signal such that an alarm provided in an incident response team 40 in a remote location sets off when it is determined that there is a fault. The alarm sets off in a state where the alarm issuance signal is received.

The processing computing unit 20 is configured to determine a developing direction of a fault by chronologically determining detection data from the respective detection elements after identifying the place of occurrence of a fault. More specifically, the processing computing unit 20 identifies a developing direction of a fault by receiving detection data from the detection network 10 formed of at least two detection elements, that is, based on a difference in data receiving times of at least two respective detection elements which transmitted the detection data indicating that there is a fault. For example, in a case where the detection network is configured by three detection elements, the processing computing unit 20 identifies a developing direction of a fault by setting a first detection element, which received fault detection data first, as a start point of the direction and setting a second detection element, which received the next fault detection data, as an end point. In addition, in a case where fault detection data is received from a third detection element, the processing computing unit 20 identifies, as a developing direction of a fault, a direction of a region with a fault, which expands from the first detection element toward the second and third detection elements with the first detection element as a start point.

When image data is included in the acquired detection data and it is determined that a fault has not occurred, the processing computing unit 20 is configured to transmit detection data to a monitor unit (not illustrated) included in the incident response team 40 in a remote location. In addition, when image data is included in the acquired detection data and a place of occurrence of a fault is identified or when image data is included in the acquired detection data and a developing direction of a fault is identified, the processing computing unit 20 is configured to switch to an image by a visible imager 17 which is the closest to the identified place of occurrence of a fault to transmit the image to the monitor unit (not illustrated) included in the incident response team 40 in a remote location. By checking the image by the visible imager 17 which is the closest to the identified place of occurrence of a fault, the state of the fault can be checked in detail. If the visible imager 17 can move to the vicinity of the place of occurrence of a fault, the processing computing unit 20 is configured to move the position of the visible imager 17 to the closest vicinity. As a consequence, the incident response team 40 in a remote location can check a region with a fault, which is further expanded, or the state of the place.

As described above, in a remote location, a fault which has occurred in a wide region of the plant can be learned quickly, a state thereof can be learned in detail, and a process in response to the fault can be performed by using information learned in detail. Therefore, it is not necessary to make an operator, who rushes to a spot of the occurrence to handle a fault, stand by at a place in the vicinity when the system has detected that a fault has occurred, and detailed information on the fault can be obtained in a remote location. By configuring a detection network which enables the monitoring of a wide region of a subject being monitored, the occurrence of a fault at an unexpected place can be detected. In addition, based on the detailed information, an extent of a state of a fault in a device can be easily learned or the necessity of the stop of the plant can be easily determined. For example, in a case where there is an operator in the vicinity of a place of occurrence of a fault, the processing computing unit 20 identifies a path on the floor or in the plant, which is a place separated away from the place of occurrence of a fault or a direction different from a developing direction of a fault, as an evacuation path, to suggest handling measures, and causes a monitor (not illustrated) or a guide light, which is provided in the system, to displaying the path such that the operator can safely evacuate.

The storage unit 30 is configured to separately record a normal range determined based on past detection data and detection data continuously detected by each detection element. In addition, the storage unit 30 is configured to transmit data of a normal range, which is corresponding detection data, to the processing computing unit 20 in response to a request from the processing computing unit 20. The normal range is recorded as many as the number of types of data detected by each detection element, and is periodically updated by an administrator based on the past detection data. The storage unit 30 records a value or an image, which is determined to be within a range of normal values by the processing computing unit 20, or detection data related to the presence or absence of gas, flame, and smoke as past data.

In addition, the detection elements are at least one type of detection element selected from the group consisting of a sound detector 11, a vibration detector 12, a gas detector 13, a flame detector 14, a smoke sensor 15, an infrared imager 16, and the visible imager 17.

At least three sound detectors 11 are provided in a subject being monitored, and are sound sensors configured to detect the volume and frequency of a detectable region thereof. An explosion-proof microphone can be given as an example of a sound sensor. In a case where the sound detectors 11 are set as one type of detection element, the processing computing unit 20 acquires data of volume and frequency detected by the sound detectors 11, and determines the presence or absence of a fault by means of the sound detectors 11 by comparing whether values thereof are within a normal range of volume and a normal range of frequency, which are respectively recorded in the storage unit 30, or outside the normal ranges. By detecting the level of volume and a change in the frequency of sound, for example, a fault in a rotary device provided in the LNG liquefaction plant can be detected.

The vibration detectors 12 are provided on at least three devices in a subject being monitored, and are vibration sensors configured to detect the amplitude and frequency of vibration of the provided devices. A piezoelectric vibration sensor can be given as an example of a vibration sensor. In a case where the vibration detectors 12 are set as one type of detection element, the processing computing unit 20 acquires data of amplitude and frequency detected by the vibration detectors 12, and determines the presence or absence of a fault by means of the vibration detectors 12 by comparing whether values thereof are within a normal range of amplitude and a normal range of frequency, which are respectively recorded in the storage unit 30, or outside the normal ranges.

At least three gas detector 13 are provided in a subject being monitored, and are gas sensors configured to detect the presence or absence of a detectable region thereof. A contact combustion gas sensor, a laser gas sensor, an optical fiber gas sensor can be given as an example of a gas sensor. In a case where the gas detectors 13 are set as one type of detection element, the processing computing unit 20 determines the presence or absence of a fault by means of the gas detectors 13 based on the presence or absence of gas detected by the gas detectors 13.

At least three flame detectors 14 are provided in a subject being monitored, and are flame detectors configured to detect the presence or absence of flame in a detectable region thereof. An explosion-proof infrared flame detector can be given as an example of the flame detector 14. In a case where the flame detectors 14 are set as one type of detection element, the processing computing unit 20 determines the presence or absence of a fault by means of the flame detectors 14 based on the presence or absence of flame detected by the flame detectors 14.

At least three smoke sensors 15 are provided in a subject being monitored, and are smoke sensors configured to detect the presence or absence of smoke in a detectable region thereof. A photoelectric smoke sensor can be given as an example of the smoke sensor 15. In a case where the smoke sensors 15 are set as one type of detection element, the processing computing unit 20 determines the presence or absence of a fault by means of the smoke sensors 15 based on the presence or absence of smoke detected by the smoke sensors 15. By detecting the presence or absence of smoke, the occurrence of a fault can be detected earlier than the occurrence of flame.

At least three infrared imagers 16 are provided in a subject being monitored, and are infrared cameras configured to chronologically acquire an image of temperature distribution of a detectable region thereof. A quantum (cooling type) infrared thermography can be given as an example of an infrared camera. In a case where the infrared imagers 16 are set as one type of detection element, the processing computing unit 20 acquires temperature distribution data of a detectable region, which is detected by the infrared imager 16, and determines the presence or absence of a fault by means of the infrared imagers 16 by comparing whether the temperature distribution is within a normal range of temperature, which is recorded in the storage unit 30, or outside the normal range.

At least three visible imagers 17 are provided in a subject being monitored, and are visible cameras configured to chronologically acquire an image of a detectable region thereof. A visible camera with a zoom function can be given as an example of a visible camera. The visible imagers 17 each are formed of, for example, a rail moving type visible camera, and is configured to be movable upon a request from the processing computing unit 20.

In a case where the visible imagers 17 are set as one type of detection element, the processing computing unit 20 acquires image data, which is detected by the visible imager 17, and chronologically acquires image data of immediately previous time, which indicates an image thereof recorded in the storage unit 30, as a normal range (that is, a range of a normal image). The processing computing unit 20 compares detected image data with image data acquired as a normal range, and determines the presence or absence of a fault by means of the visible imager 17 based on whether there is a static or dynamic difference. In addition, when it is determined that there is no fault based on detection data, which is detected by the visible imager 17, the processing computing unit 20 transmits the detection data to the storage unit 30 and transmits the detection data to the monitor unit included in the incident response team 40 in a remote location. Accordingly, for example, a subject being monitored can be monitored through a monitor in a remote location in the long-term, and a chronological change can be detected. As described above, when a fault has occurred and a place of occurrence of a fault is identified or when a fault has occurred and a developing direction of a fault is identified, the processing computing unit 20 switches to an image by the visible imager 17, which is the closest to the identified place of occurrence, to transmit the image to the monitor unit. Accordingly, the state of place of occurrence of a fault or the state of a faulty device can be checked.

Based on detection data obtained from the detection elements described above, information shown in the following Table 1 can be obtained as information of an assumed fault such as a gas leak, fire, a fault in a rotary device, liquid leakage, and an intruder in the LNG liquefaction plant. Since the detection network is configured by combining a plurality of detection elements, a plurality of faults can be detected, and a device corresponding to each of the plurality of faults, the position of a rotary device, and a device number can be identified and a response process in which the information is used can be performed.

TABLE 1

| Detection element | Assumed fault | | | | |
|---|---|---|---|---|---|
| | Gas leak | Fire | Fault in rotary device | Liquid leakage | Intruder |
| Sound detector | Presence or absence of sound of fault caused by gas leak | Presence or absence of device fault caused by fire | Presence or absence of fault in rotary device (gas turbine, compressor, pump, and the like), and checking state of fault (bearing damage, cavitation, and the like) | — | Presence or absence of sound of intrusion by intruder |
| Vibration detector | Presence or absence of vibration caused by gas leak, and identifying device and piping with a fault | — | Presence or absence of fault in rotary device, and checking state of fault | — | — |
| Gas detector | Presence or absence of gas (methane, propane, and the like) leak | — | Presence or absence of gas (methane, propane, and the like) leak caused by fault in rotary device | Presence or absence of liquid leakage (propane, mixed refrigerant, and the like) | — |
| Flame detector | — | Presence or absence of flame caused by fire | — | — | — |
| Smoke detector | — | Presence or absence of fuming caused by fire | Presence or absence of fuming caused by fault in rotary device | — | — |

TABLE 1-continued

| Detection element | Assumed fault | | | | |
|---|---|---|---|---|---|
| | Gas leak | Fire | Fault in rotary device | Liquid leakage | Intruder |
| Infrared detector | Presence or absence of high-temperature or low-temperature point caused by gas leak, and identifying high-temperature or low-temperature device | Presence or absence of high-temperature point caused by fire, and identifying high-temperature device | Presence or absence of high-temperature or low-temperature point caused by fault in rotary device, and identifying high-temperature or low-temperature device | Presence or absence of high-temperature or low-temperature point caused by liquid leakage, and identifying high-temperature or low-temperature device | Presence or absence of intruder, and identifying position |
| Visible imager | — | Checking state of fire | Checking state of fault in rotary device such as damage and deformation | Checking state of liquid leakage | Identifying intruder |

Next, by describing an operating mode of the plant-monitoring system having configurations described above, the first embodiment of a plant-monitoring method according to the invention will be described in detail as follows. The plant-monitoring method according to the embodiment includes an acquiring step, a processing computing step, and a storing step.

In the acquiring step, the detection network configured by disposing at least three respective detection elements in the plant is used to acquire detection data from the detection elements. Detection data from the respective detection elements randomly provided on plant configuring devices may be combined.

In the processing computing step, one or more pieces of detection data detected by the detection elements are acquired, and a normal range corresponding to the one or more pieces of detection data is obtained. In a case where all of the one or more pieces of acquired detection data are within the normal range, it is determined that a fault has not occurred. In a case where at least one piece of data, out of the pieces of acquired detection data, is outside the normal range, it is determined that a fault has occurred.

In a case where it is determined that a fault has not occurred in the processing computing step, detection data is transmitted to the storage unit 30 as past data so as to be recorded therein. In addition, when it is determined that a fault has occurred in the processing computing step, the position of a detection element which transmitted detection data indicating that there is a fault is identified as a place of occurrence of a fault. In a case where two or more pieces of fault detection data are simultaneously received, it is determined that there are two or more places of occurrence of a fault and the places are identified as places of occurrence of a fault. In addition, when it is determined that there is a fault, an alarm issuance signal is transmitted to the alarm provided in the incident response team 40 in a remote location. The alarm of the incident response team 40 sets off in a state where the alarm issuance signal is received.

Next, in the processing computing step, after the place of occurrence of a fault is identified, a developing direction of a fault is identified based on a difference in data receiving times between at least two respective detection elements which transmitted the detection data indicating that there is a fault. In addition, when it is determined that image data is included in the acquired detection data and a fault has not occurred, the image data is transmitted to the monitor unit (not illustrated) included in the incident response team 40 in a remote location. The monitor unit continuously receives the image data to display the image data as an image.

In addition, when a place of occurrence of a fault is identified or when a developing direction of a fault is identified, an image by the visible imager 17, which is the closest to the identified place of occurrence, is switched to be transmitted to the monitor unit (not illustrated) included in the incident response team 40 in a remote location. If the visible imager 17 can move to the vicinity of the place of occurrence of a fault, the position of the visible imager 17 is moved to the closest vicinity.

In the storing step, detection data from each detection element is received and is recorded as recorded data in the storage unit 30. A normal range determined based on past detection data and detection data continuously detected by each detection element are separately recorded. In addition, data of a normal range, which is corresponding detection data, is transmitted to the processing computing unit 20 in response to a request from the processing computing unit 20. A value or image data, which is determined to be within a range of normal values by the processing computing unit 20, is recorded as past data in the storage unit 30.

Next, FIG. 2 shows a second embodiment of a plant-monitoring system and a monitoring method according to the invention. The plant-monitoring system according to the embodiment shown in FIG. 2 is primarily different in that an incident response team 50 provided in a remote operation place is provided with a remote operation unit (not illustrated) for remotely operating the system and a device in the plant. In addition, description of the same configurations as the first embodiment will be omitted.

The remote operation unit is configured to estimate a cause of a fault based on the state of the fault, which is obtained from an alarm and a monitor of the incident response team 50, and to perform a process to handle the fault in the plant by remote operation from the incident response team 50. An operator of the incident response team 50 estimates a cause of a fault and remotely operates. In addition, for example, corrective operation, load reduction operation, and stop operation are performed as operation to be performed.

The plant-monitoring method according to the embodiment is primarily different from the first embodiment in that a remote operation step is further included. In the remote operation step, a cause of a fault is estimated based on the state of the fault, which is obtained from the alarm and the monitor in the remote operation place in the processing computing step, and a process in response to the fault is performed by remote operation from the incident response team 50.

According to the embodiment, the same effects as in the first embodiment can be achieved, and by carrying out the process in response to the fault by means of the remote operation unit based on detailed information learned in a remote location (remote operation place), the response process can be safely and reliably performed.

INDUSTRIAL APPLICABILITY

In the plant-monitoring system and the monitoring method according to the invention, a fault which has occurred in a wide region of the plant can be remotely learned in detail. In addition, a process in response to the occurrence of a fault can be performed from a remote location.

REFERENCE SIGNS LIST 10 detection network
11 sound detector
12 vibration detector
13 gas detector
14 flame detector
15 smoke sensor
16 infrared imager
17 visible imager
20 processing computing unit
30 storage unit
40, 50 incident response team

The invention claimed is:

1. A plant-monitoring system comprising:
   at least three detection elements, the detection elements being at least one type of detection element for monitoring a subject being monitored;
   a detection network configured by disposing the at least three detection elements in a plant;
   a storage unit that receives detection data from each of the detection elements to record the detection data as recorded data; and
   a processing computing unit that:
     receives the detection data from each of the detection elements,
     determines presence or absence of a fault by comparing the detection data with the recorded data, and
     in a case where occurrence of the fault is recognized:
       identifies a place of occurrence of the fault based on the detection data,
       identifies a developing direction of the fault based on a difference in data receiving times of at least two of the detection elements, and
       transmits the result of the place of occurrence of the fault to a predetermined incident response team, wherein
   the processing computing unit sets, based on the data receiving times, one of the detection elements as a start point and another of the detection elements as an end point, and identifies, as the developing direction, a direction of a region that expands from the start point toward the end point.

2. The plant-monitoring system according to claim 1, wherein the processing computing unit further transmits the result of the developing direction to the predetermined incident response team.

3. The plant-monitoring system according to claim 1, further comprising a remote operation unit that operates a device in the plant.

4. The plant-monitoring system according to claim 1, wherein the detection elements are at least one type of detection element selected from the group consisting of a sound detector detecting volume and frequency, a vibration detector detecting amplitude and frequency of vibration, a gas detector detecting occurrence of gas, a flame detector detecting occurrence of flame, a smoke sensor detecting occurrence of smoke, an infrared imager acquiring an image of an infrared region, and a visible imager acquiring an image of a visible region.

5. The plant-monitoring system according to claim 1, wherein the detection network is formed by three-dimensionally disposing at least four detection elements.

6. A plant-monitoring method comprising:
   acquiring detection data from detection elements by using a detection network configured by disposing at least three detection elements, the detection elements being at least one type of detection element for monitoring a subject being monitored, in a plant;
   receiving the detection data from each of the detection elements to record the detection data as recorded data;
   receiving the detection data from each of the detection elements,
   determining presence or absence of a fault by comparing the detection data with the recorded data, and
   in a case where occurrence of the fault is recognized:
     identifying a place of occurrence of the fault based on the detection data,
     identifying a developing direction of the fault based on a difference in data receiving times of at least two of the detection elements, and
     transmitting the result of the place of occurrence of the fault to a predetermined incident response team, wherein
   the identifying the developing direction comprises setting, based on the data receiving times, one of the detection elements as a start point and another of the detection elements as an end point, and identifying, as the developing direction, a direction of a region that expands from the start point toward the end point.

7. The plant-monitoring method according to claim 6, further comprising transmitting the result of the developing direction to the predetermined incident response team.

8. The plant-monitoring method according to claim 6, further comprising a remote operation step of operating a device in the plant.

9. The plant-monitoring method according to claim 6, wherein at least one type of detection element selected from the group consisting of a sound detector detecting volume and frequency, a vibration detector detecting amplitude and frequency of vibration, a gas detector detecting occurrence of gas, a flame detector detecting occurrence of flame, a smoke sensor detecting occurrence of smoke, an infrared imager acquiring an image of an infrared region, and a visible imager acquiring an image of a visible region is used as the detection elements.

10. The plant-monitoring method according to claim 6, wherein the detection network is formed by three-dimensionally disposing at least four detection elements.

* * * * *